June 7, 1960 N. D. FULTON ET AL 2,939,656
AIRCRAFT ARRESTING APPARATUS
Filed June 6, 1956 3 Sheets-Sheet 2

INVENTORS
NATHANIEL D. FULTON
NOEL Y. ROTHMAYER
BY William R. Wright
AGENT

June 7, 1960     N. D. FULTON ET AL     2,939,656
AIRCRAFT ARRESTING APPARATUS
Filed June 6, 1956     3 Sheets-Sheet 3

INVENTORS
NATHANIEL D. FULTON
NOEL Y. ROTHMAYER
BY
AGENT

United States Patent Office 2,939,656
Patented June 7, 1960

2,939,656

AIRCRAFT ARRESTING APPARATUS

Nathaniel D. Fulton, Bernardsville, and Noel Y. Rothmayer, Morristown, N.J., assignors, by mesne assignments, to Thiokol Chemical Corporation, a corporation of Delaware Filed June 6, 1956, Ser. No. 589,792

4 Claims. (Cl. 244—110)

The present invention relates to aircraft arresting means and more particularly to braking devices and controlled deceleration mechanism therefor.

The principal object of the invention is to provide a friction brake which can be accurately controlled to effect any given rate, magnitude and duration of deceleration applied to a moving vehicle within the limits of the apparatus.

A further object of the invention is to provide a simple aircraft arresting system constructed of available commercial equipment and employing moving parts of low inertia.

A more particular object is to provide an aircraft arresting apparatus that may be readily adjusted to arrest aircraft traveling in different directions.

In carrying out the objects of the invention, there is provided a pair of parallel rails securely anchored, upon each of which is mounted a carriage for sliding movement thereon. Tension devices normally hold the carriages near one end of the rails and an arresting cable is connected to the forward ends of the carriages. This cable is engaged by the aircraft on landing and causes the carriages to travel along the rails and, as they do so, braking mechanisms therein grip the rails with a controlled force to gradually decelerate the aircraft. For applying the brakes there is provided a camming rail to one side of and parallel with each carriage supporting rail. The brakes are pneumatically applied and the system contemplates a valve controller in cooperative relationship with the camming rail which is so configured that, as the carriage advances, the valve controller is operated to apply the brakes at a gradual rate increasing to the maximum required to bring the aircraft to a stop within a specified distance. A presettable limiting control is provided to regulate the applied braking pressure for plane weights to be arrested.

A still further object of the invention resides in the provision of a parachute device arranged to supplement the braking action by absorbing a large percentage of the initial energy required for stopping the aircraft.

Other objects of the invention will be pointed out in the following description and claims and illustrated in the accompanying drawings, which disclose, by way of examples, the principle of the invention and the best mode, which has been contemplated, of applying that principle.

Figure 1:
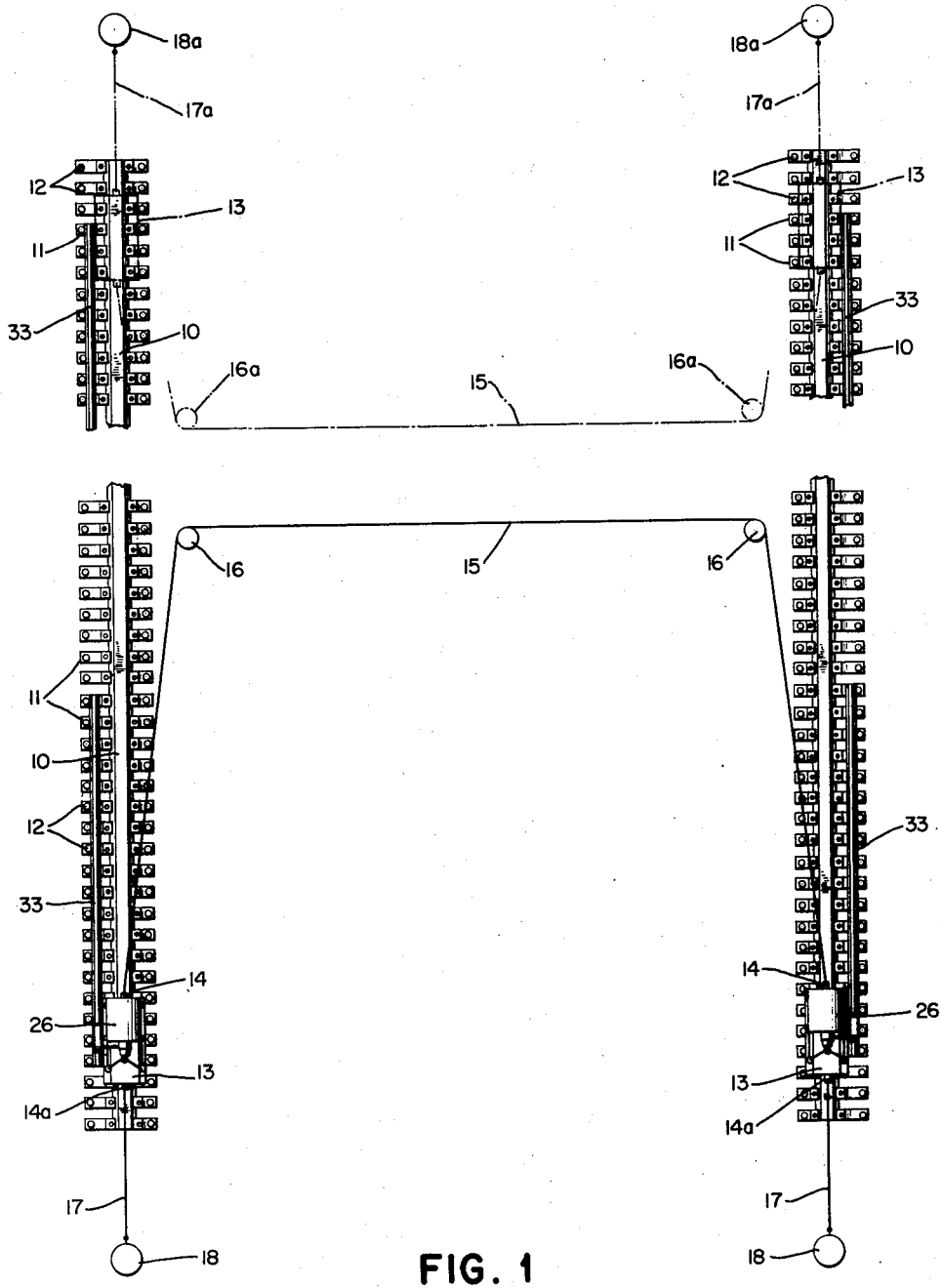
Fig. 1 is a general layout view of the landing apparatus showing the relative arrangement of the guide rails, carriages and controlling cam rails.

Referring to the drawings, 10 represents the main guide rails extending in parallel and spaced about 170 feet apart, which are anchored to cross ties 11 provided in turn with ground anchors 12. A length of about 1,000 feet is contemplated for the rails.

A carriage 13 slidably supported on each of the rails 10 has a length of about 10 feet and at its forward end is provided with a connection 14 to which cable 15 is detachably secured. The cable 15 passes around sheaves 16 as shown in Fig. 1. To maintain tension in the cable, the rear ends of carriages 13 have connections 14a, to which further cable connections 17 are made to tensioning devices 18 which may be well known forms of spring drum devices. With the arrangement shown, the drums 18 hold the carriages 13 in the positions shown with cable 15 under tension.

The operation is such that the arresting hook of an aircraft landing in a direction from bottom to top of Fig. 1 will engage the horizontal section of cable 15, cause it to bow between the sheaves 16 and then draw carriages 13 along rails 10. During such excursion, brakes carried by the carriages will be applied to resist and decelerate the aircraft's pull to bring it to a stop.

The arrangement of the apparatus is such that the carriages may be initially located at the opposite or upper ends of rails 10 as indicated in dotted outline in Fig. 1. In such case, the upper end of each carriage is connected to tensioning device 18a through cable 17a and the cable 15 is connected to the lower ends of the carriages and passed around sheaves 16a. There is thus provided a symmetrical arresting device wherein the relative location of tensioning devices 18 and sheaves 16 with respect to one end of the rail is the same as the relative location of tensioning devices 18a and sheaves 11a, with respect to the other end of the rails and the action is the same.

It may be pointed out with reference to Fig. 1 that the sheave and cable arrangement shown substantially reduces the impact on the cable and aircraft at contact and immediately thereafter. This is due to the fact that at contact the aircraft has to set in motion only that portion of the cable stretched between the sheaves, while the remaining cable and the braking carriages are at rest, gradually increasing in speed as the cable geometry changes following contact of aircraft and cable. It is not until the cable sections on either side of the engagement point are linearly extended that the carriages and cable move with the same velocity as the aircraft. Furthermore, the initial motion imparted to that portion of the cable stretched between the sheaves is a rotary rather than a linear motion, which reduces the inertia of that portion of the cable by one-half of that which would result if the motion were linear.

*Braking mechanism*

Figures 2, 3:
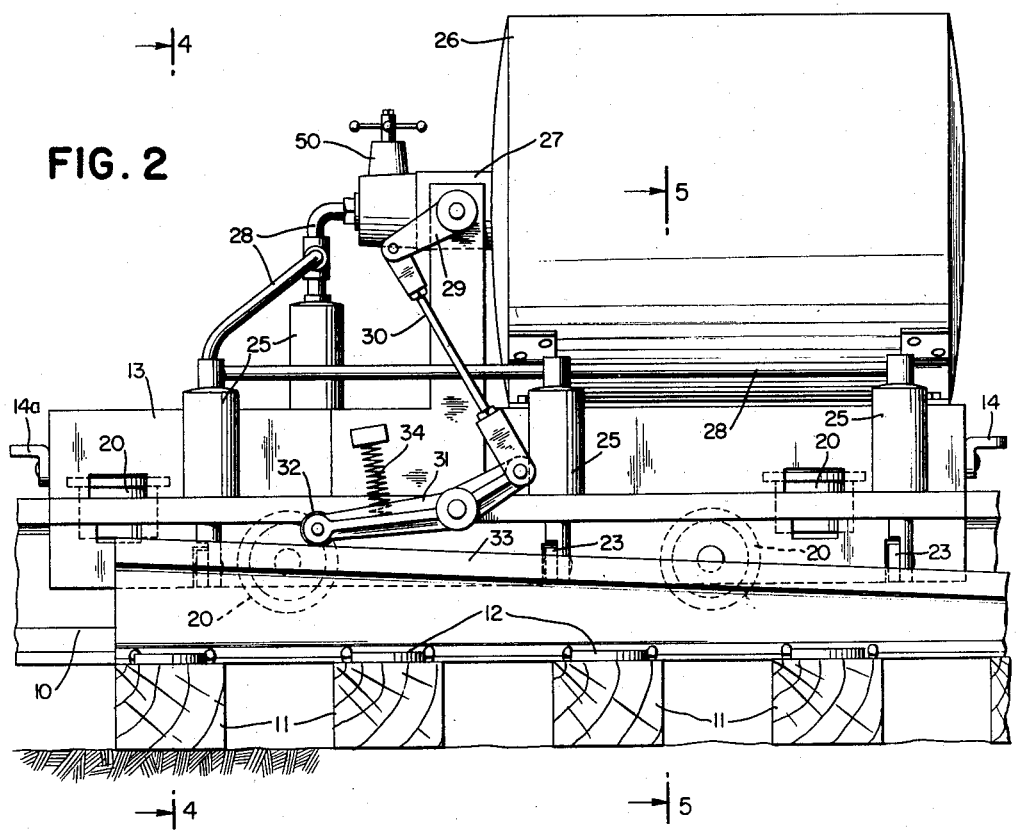
Fig. 2 is a side elevation view of one of the arresting carriages with its braking and controlling devices.
Fig. 3 is a diagrammatic view showing the manner in which a parachute device may be incorporated in the apparatus.
Figure 4:
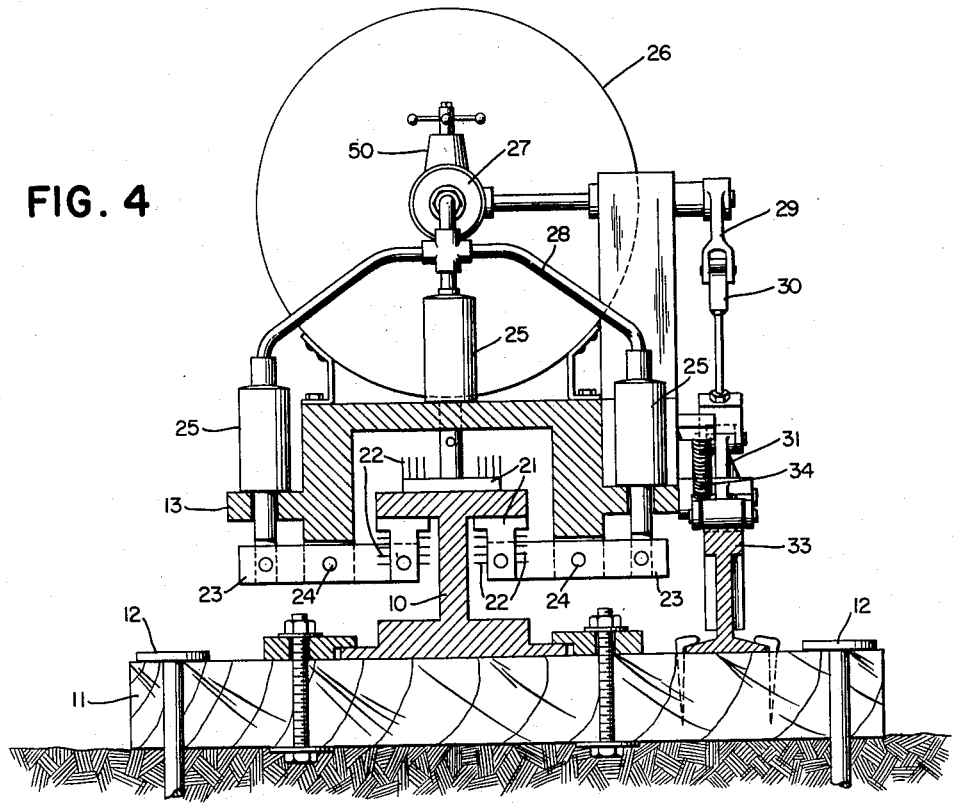
Fig. 4 is a sectional view of the carriage taken on lines 4—4 of Fig. 2.
Figure 5:
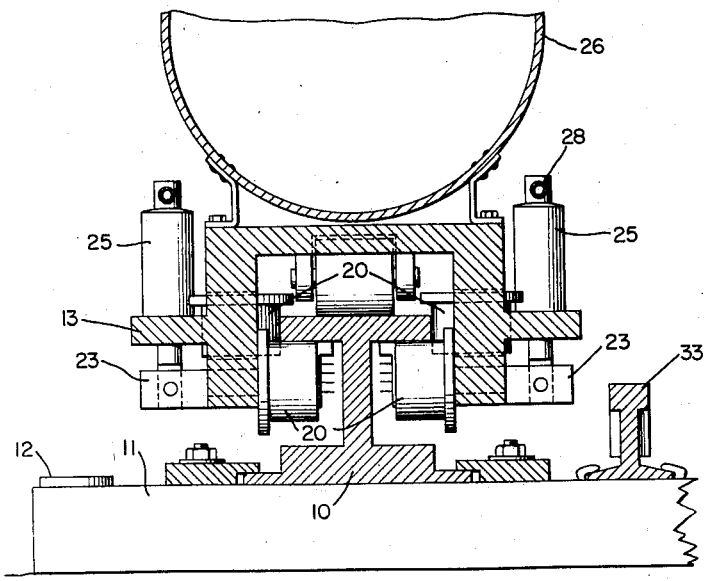
Fig. 5 is a sectional view of the carriage taken on lines 5—5 of Fig. 2.

Referring particularly to Figs. 2, 4 and 5, the carriage 13 is provided with a plurality of guide rollers 20 through which the carriage is supported on rail 10 and directional thrust is borne.

Brake shoes 21, provided with cooling fins 22, are spaced along the carriage to engage the upper and lower sides of the rail head as shown in Fig. 4.

The lower brake shoes are carried by arms 23 pivoted at 24 to the carriage frame with the outer ends of arms 23 adapted to be depressed by plungers of air or hydraulic cylinders 25 secured to the carriage. The upper brake shoe 21 is directly acted upon by the plunger of a further air cylinder 25.

Air or other fluid under pressure is directed from a supply tank 26 mounted on carriage 13, through regulating valve 27 and lines 28 to the several brake actuating cylinders 25.

The valve 27 has an arm 29 connected by a link 30 to a lever 31 which has a roller 32 at its free end in engagement with an inclined surface or cam 33. A spring 34 biases the linkage in a direction tending to open valve 27 and direct brake applying pressure to cylinder 25, as carriages 13 advance along rails following engagement.

This cam 33, of which there is one for each carriage 13 (see Fig. 1) and a counterpart at the opposite end of the rails for reverse operation of the apparatus, is secured to the cross ties 11 as shown in Fig. 4 and is tapered to form an incline, calculated in accordance with the maximum landing force that is to be handled to operate valve 27 and enable application of the brakes in a gradually increasing manner. The valve 27 (Fig. 2) may be provided with a presettable limiting control by-pass or bleeder 50 which will limit the pressure in the braking cylinder 25 to a maximum value, irrespective of the extent of travel along course 33. Thus, the braking force and aircraft deceleration can be conveniently and quickly preadjusted to accommodate aircraft of different landing weights or structural limitations.

Recapitulating the operation of the apparatus, the arresting cable is engaged by an aircraft on landing, with the forward motion of the aircraft causing the cable to exceed the preset cable tension and start movement of the carriages. The brake shoes start to travel down the rails at a gradually accelerating velocity determined by the geometry of the system. At the start of travel the aircraft might travel, for example, about 210 feet while the brake shoe assemblies travel 75 feet. During this interval, the cam operated mechanism, shown as pneumatic by way of example, allows gradual application of braking force to the brake shoes with the load being gradually increased to the maximum required to bring the aircraft to a stop within a specified distance.

After the aircraft comes to a stop, the brakes are released by venting brake actuating cylinders 25, and the cables removed from engagement with the aircraft. Suitable mobile units may be employed to return the carriages to their original positions for the next landing, and the arresting cable will also be run back and placed in position on the sheaves.

The apparatus finds further utility as a safety system for runway overrun and can readily be installed at the extremity of a flying field runway.

Fig. 3 illustrates diagrammatically the manner in which a parachute may be employed to supplement the braking action of carriage 13. An extension 40 of carriage 13 is provided with a trough 41 in which a parachute 43 may be laid out horizontally and provided with an erecting device 42, connected to cable 15 through a connection 44 to open the parachute after a predetermined runout.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention therefore to be limited only as indicated by the scope of the following claims.

What is claimed is:

1. An aircraft arresting apparatus comprising a pair of parallel rail members, a pair of like carriages one for each rail mounted thereon for movement along the rails, braking mechanism on each carriage for effecting braking engagement between the carriage and the related rail, a stationary control cam for each rail spaced therefrom and parallel thereto, a braking control device supported by each carriage and arranged to travel along and in contact with its related cam, said cam being configured to operate the control device to cause the same to vary the effect of its related braking mechanism during the movement of the carriage.

2. An aircraft arresting apparatus having a rail member, a carriage mounted on said rail member for movement thereon and an aircraft engaging cable connected to the carriage at one end for drawing the carriage along the rail, in combination with braking means for the carriage comprising friction brakes mounted on the carriage and engageable with the rail to retard the movement of the carriage, a spring for causing operation of the braking means and a stationary brake operating control device positioned alongside the rail for normally rendering said spring ineffective and for causing the spring to become effective during movement of the carriage whereby said brakes will be applied in a predetermined manner in accordance with the position of the carriage with respect to said control device.

3. An aircraft arresting apparatus having a rail member of predetermined length, a carriage mounted on said rail member for movement thereon in both directions and initially positionable near either end of said rail member, in combination with an aircraft engaging cable selectively connectible to said carriage to draw the same along the rail member from its initial position, braking means for the carriage supported thereby and arranged to grip the rail member to retard the movement of the carriage, brake operating control devices positioned alongside the rail, the device being effective to cause said braking means to be applied in a predetermined manner in accordance with the position of the carriage with respect to said control device.

4. In an apparatus of the class described, a guide rail, a carriage thereon and initially positioned at either end of said rail, an aircraft arresting cable connectible to said carriage to draw the same along the rail from its initial position, braking mechanism supported by the carriage, and means located near both ends of said rail for operating said braking mechanism during the movement of the carriage in either direction along said rail.

References Cited in the file of this patent

UNITED STATES PATENTS

| | | |
|---|---|---|
| 708,332 | Ennor | Sept. 2, 1902 |
| 1,874,754 | James | Aug. 30, 1932 |
| 2,488,051 | Brodie | Nov. 15, 1949 |